United States Patent [19]

Wayne et al.

[11] 4,260,958
[45] Apr. 7, 1981

[54] APPARATUS AND METHOD FOR DEPOSITION OF ELECTRICAL POWER IN AN ELECTRIC DISCHARGE LASER

[75] Inventors: Robert J. Wayne, Glastonbury; Lanny M. Laughman, Bolton; Peter P. Chenausky, Avon; Carl J. Buczek, Manchester, all of Conn.

[73] Assignee: United Technologies Corporation, Hartford, Conn.

[21] Appl. No.: 955,991

[22] Filed: Oct. 30, 1978

[51] Int. Cl.³ .............................................. H01S 3/097
[52] U.S. Cl. ........................................... 331/94.5 PE
[58] Field of Search .................. 331/94.5 D, 94.5 PE, 331/94.5 G, 94.5 T; 330/4.3; 313/231, 231.4, 231.6, 311

[56] References Cited

U.S. PATENT DOCUMENTS

| | | | |
|---|---|---|---|
| 3,641,457 | 2/1972 | Brown et al. | 331/94.5 PE |
| 3,740,662 | 6/1973 | Farcy et al. | 331/94.5 PE |
| 3,743,963 | 7/1973 | Bullis et al. | 331/94.5 PE |
| 3,772,610 | 11/1973 | Foster et al. | 331/94.5 PE |
| 3,886,481 | 5/1975 | Foster et al. | 331/94.5 T |
| 4,008,407 | 2/1977 | Fletcher et al. | 313/311 |
| 4,016,448 | 4/1977 | Nighan et al. | 313/231 |
| 4,077,018 | 2/1978 | Fahlen et al. | 331/94.5 PE |
| 4,080,578 | 3/1978 | Farish et al. | 331/94.5 PE |
| 4,134,083 | 1/1979 | Sasnett et al. | 331/94.5 T |
| 4,145,669 | 3/1979 | Babcock et al. | 331/94.5 PE |

OTHER PUBLICATIONS

S. A. Wutzke et al., "CW Pin Discharge Laser", Westinghouse Research Laboratories, Final Technical Report, Nov. 30, 1974.

*Primary Examiner*—James W. Davie
*Attorney, Agent, or Firm*—Lawrence A. Cavanaugh

[57] ABSTRACT

An improved electrode configuration and method for the deposition of electrical power into an electric discharge laser having a gas path transversely disposed to an optical axis and the electric field is disclosed. The electrode configuration includes a cathode, having one or more common geometry rod elements of a thoriated material disposed transverse to a gas path and a planar anode disposed opposite the cathode in a parallel relationship thereto wherein the cathode and the anode define the gas path therebetween. The electrode configuration is adapted for operation without ballast resistance in the electrical circuit and without the utilization of preionization means. The electrode configuration provides a discharge having substantially diffuse and uniform characteristics within the discharge region.

16 Claims, 4 Drawing Figures

APPARATUS AND METHOD FOR DEPOSITION OF ELECTRICAL POWER IN AN ELECTRIC DISCHARGE LASER

BACKGROUND OF THE INVENTION

The invention herein described was made in the course of or under a contract or subcontract thereunder with the Department of the Navy.

This invention relates to electric discharge lasers and more particularly to an improved discharge configuration adapted for use with electric discharge lasers having a transverse flowing gas medium.

Electric discharge lasers having a flowing gas gain medium are well known in the art. The basic motivation for employing a flowing gas gain medium for convective cooling of the laser discharge gases, especially for molecular discharge systems, and the benefits derived therefrom, such as enhanced laser performance, are taught by Brown et al in U.S. Pat. No. 3,641,457 filed Sept. 10, 1969 and held with the present application by a common assignee. Brown et al discloses the importance of maintaining the proper ratio of the electric field to the neutral gas density in the laser discharge to maximize energy transfer from the discharge electrons to the upper energy level of the lasing gas. Furthermore, the optical power output of a molecular discharge laser is porportional to the difference between the population densities of the upper energy level and the lower energy level of the lasing gas. As is disclosed by Brown et al, the population density of the upper energy level is directly enhanced by operating at pressures exceeding several torr, with greater enhancements being achieved as the pressure approaches atmospheric. By employing a flowing gas gain medium to convectively cool the discharge gases, the population density of the lower energy level is reduced which favorably influences laser performance.

While these basis principles influencing electric discharge laser performance have been demonstrated in a geometry in which the directions of the flowing gas, the electric field, and the optical axis are mutually coaxial, the resulting total system size and weight is not optimum. This occurs primarily because of the high pressure drop along the flow path, typically on the order of several meters, of the gas through the laser cavity. Pressure drop considerations in overall laser system design, especially when a closed cycle recirculating gas loop is employed, significantly impact the recirculating pump size, and therefore, overall laser system size, weight and cost. These considerations in many applications have lead to the development of alternate laser discharge and cavity geometries.

One configuration which is well known in the art is the electron beam stabilized transverse laser geometry. In this configuration, the flow direction, the discharge electric field direction, and the optical axis are mutually perpendicular. Typically, the discharge dimension both in the flow direction and transverse to both the flow direction and optical axis is short in comparison to the total optical path length. This results in a requirement for having discharge electrodes having large extended areas. To provide a uniform discharge over the extended area of the electrode at high pressures and to prevent the flow field from convecting the discharge out of the laser cavity in the downstream flow direction, a high energy electron beam is employed to produce a low level of ionization of the gas uniformly throughout the laser discharge region. At high pressures (greater than fifty torr), the low level of ionizaton provided by the electron beam moderates the onset of discharge instabilities which cause the desired diffuse discharge to collapse catastrophically into an arc.

As is well known in the art, arc formation destroys the laser output because the entire uniformly distributed diffuse electron current flow of the discharge is concentrated into the very small region of the arc in which the electric field to neutral gas density ratio is no longer maintained at the proper level for optimum population of the upper energy level of the laser gas. In addition, significant gas heating in the arc channel occurs which increases the lower energy level population, further destroying laser performance.

A transverse discharge configuration exhibits a very small flow impedance in the flow field due to discharge electrodes and/or optical elements and the discharge dimension in the flow direction is short, on the order of ten to twenty centimeters. Accordingly, the pressure drop across the laser cavity at high flow velocities is minimized. Also, in a transverse discharge configuration, the combined high flow velocity and short discharge length in the flow direction reduces gas residence time within the discharge. As taught by Nighan et al in U.S. Pat. No. 4,016,448 filed Nov. 26, 1975 and held with the present application by a common assignee, there is an inverse relationship between the maximum power density that can be deposited into the laser discharge before the onset of arc formation and the time the gas remains in the discharge region. Therefore, the transverse laser discharge configuration in addition to offering the potential for low pressure drop operation also offers the potential capability of extending to higher levels the maximum power density that can be deposited into the discharge prior to the onset of arcing.

Indeed, quite impressive laser performance has been achieved with transverse gas discharge laser systems employing high energy electron beam stabilization of the discharge. However, the use of a high energy electron beam represents a significant addition to the total number of laser system components, and increases the operational complexity and total laser system cost. For many laser applications these additions are prohibitive. As a consequence, alternate methods for the stabilization of the discharge are desired for systems having the discharge transverse to the path of the gas flow. A transverse discharge configuration in which both the discharge electric field and optical axis are transverse to the flow path of the gas is disclosed by Bullis et al in U.S. Pat. No. 3,743,963 filed Sept. 10, 1969 and held with the present application by a common assignee, in which the discharge has been stabilized through the use of Radio Frequency (RF) auxiliary ionization techniques. This approach, which is similar in nature to electron beam stabilization, utilizes a RF source to produce a weakly ionized uniform plasma in the discharge region. The weakly ionized plasma results in a uniform diffuse glow discharge across discharge electrodes having an extended area and stabilizes the discharge against flow field effects which normally would sweep the discharge downstream in the flow direction. While RF discharge stabilization represents a reduction in laser system complexity and cost, compared to electron beam stabilization, additional system components are still required with this approach.

One method to eliminate the additional complexities represented by the use of either electron beam or RF discharge stabilization is disclosed by Foster et al in U.S. Pat. No. 3,772,610 filed on Sept. 20, 1971 which teaches the use of an extended length transverse discharge configuration in which the discharge is allowed to be swept downstream by the convective forces of the flow field. In this configuration, an elongated cylindrical tubular cathode is disposed within the gas stream transverse to the gas path and upstream of a segmented anode disposed flush within a channel wall. The single tubular cathode produces turbulence in the region immediately adjacent to the downstream side of the cathode surface to provide a homogeneous gaseous medium for the purpose of enhancing discharge stabilization. A single pin electrode disposed proximate to the upstream side of the tubular cathode provides start-up ionization in the gas between the pin and the cathode. Ballast resistance is employed on each of the flush mounted segmented anode elements for discharge stabilization. While this configuration attempts to take advantage of the benefits to be derived from transverse discharge operation, failure to stabilize the discharge against convective flow of the gases results in only a limited range of conditions over which the discharge can be successfully operated. Specifically, because of the forces within the convective flow, discharge operation, as taught by Foster et al, is limited to pressures of approximately 35–50 torr. A second limit, which also determines the maximum operation pressure and velocity levels, is the requirement in this configuration to produce a uniform discharge over the elongated tubular cathode without the use of auxiliary ionization for discharge stabilization. Further, because the maximum operating gas flow velocities are considerably lower than those achievable with other transverse discharge configurations, the gas residence time is significantly longer which limits the maximum attainable discharge power density before the onset of discharge arcing.

At the May, 1977 IEEE/OSA Conference on Laser Engineering and Application, Wutzke et al disclosed a pin-to-plane transverse gas discharge laser geometry in which significant improvements in discharge performance were achieved over the Foster et al configuration. In the pin-to-plane transverse discharge geometry, the cathode structure, consisting of an array of small diameter pins located on one centimeter centers in several rows along the flow direction is disposed opposite to a planar anode and transverse to the gas path. To stabilize the discharge, each cathode pin is individually ballasted with a moderate to large value of resistance. This discharge configuration is capable of producing a stable discharge at pressures of 140 torr and discharge power densities up to 50 w/cm$^3$. This performance represents approximately a factor of four increase in discharge operating pressure and approximately a factor of ten increase in discharge power density achievable over that reported by Foster et al. Furthermore, these increases were achieved at flow velocities of 150 m/sec which permits enhanced convective cooling of the discharge while also minimizing residence time of the discharge gas.

The discharge geometry disclosed by Wutzke et al has several system drawbacks. The requirement to provide individual ballasting of tens of thousands of ohms to each of the multiplicity of cathode pins results in a complex and costly cathode structure. Further, because of the magnitude of the ballast required, a significant amount of power is dissipated in the resistive ballast. This obviously impacts unfavorably on overall system efficiency. In addition, the discharge produced by the pin cathode configuration yields a highly concentrated plasma region adjacent to the pin. This results in relatively nonuniform discharge excitation along the optical axis wherein the regions immediately adjacent to the pin cathodes have discharge power densities approximately of an order of magnitude higher than the average for the whole discharge. As a consequence, the limiting power density prior to the onset of discharge arcing is determined by the power density in these localized regions rather than the average power level deposited in the total discharge. Because of this factor the average discharge power density is limited to levels significantly below those that would be determined by gas discharge residence time consideration.

Chenausky et al in U.S. patent application having Ser. No. 864,961, filed Dec. 27, 1977, and of common assignee herewith discloses an electrode configuration for the deposition of electrical power in a direction transverse to a path of flowing gas having a cathode comprising at least one row of pins in combination with at least one rod disposed downstream of and parallel to the row of pins and a planar anode disposed in a spaced apart relationship to the pins and rods. The pins are utilized as preionization electrodes and each pin is connected to a ballast resistance. The rods disposed downstream of the pins are utilized for electrical power deposition into the discharge and are unballasted which eliminates the power consumption within the electrical circuit of the power electrodes of prior art devices. At least sixty percent of the electrical power deposited into the discharge passes through the unballast power electrodes with the remaining portion of the power passing through the ballasted preionization electrodes. This electrode configuration enables high electrical power density deposition into the gas stream without the addition of complex and costly discharge stabilization elements.

SUMMARY OF THE INVENTION

One object of the present invention is to provide improved uniformity in the discharge of electrical power into the lasing gas mixture of a transverse, electric discharge laser. Another object of the present invention is to provide a simplified geometry electrode assembly for a transverse electric discharge laser.

According to the present invention, an electrode assembly for an electric discharge laser comprises a planar anode element disposed in parallel with one or more common geometry cathode elements within the flow path of the lasing gas mixture in the discharge region of the laser system, the cathode elements being comprised of a thoriated material and having a common rod-like geometry, the cathode elements being disposed, in a transverse relation to the gas flow path, along the surface of a cathode element mounting structure which is maintained by the electrode assembly in spaced relation to the anode so as to define, in combination with the anode, opposite sides of the gas flow path therebetween, the cathode elements further being adapted for response to one polarity of an electric potential signal provided from a source of electrical signals, an opposite polarity of which is presented to the anode, so as to provide in combination with the anode the electrical discharge into the lasing gas mixture flowing therebetween.

In further accord with the present invention, each of the cathode elements are adapted for response to the electric potential signal from an associated one of a plurality of individual electric potential signal sources, whereby each cathode element receives the associated source electric potential signal directly without the use of ballast resistors. In still further accord with the present invention, the rod cathode elements have a diameter in the range of from 0.15 to 0.24 centimeters. In still further accord with the present invention, the rod cathode elements are comprised of thoriated tungsten.

A primary advantage of the present invention is the high electrical power density deposition into the gas stream without complex and costly discharge stabilization elements. Additionally the utlization of unballasted electrodes significantly increases the fractional amount of the total electrical power deposition into the gas. Also the continuous electrical power deposition into the gas yields a high degree of discharge uniformity which significantly increases the level of the average discharge power density deposition into the gas before the onset of discharge arcing.

Heretofore, the establishment of a high pressure, large volume, continuous wave discharge within a flowing gas medium for the use in a transverse electric discharge gas laser has been accomplished with difficulty utilizing auxiliary sources such as preionization pins and/or electron beam preionization to initiate the discharge. The fast that an electrode configuration having a cathode including one or more common thoriated tungsten rods having diameters having between 0.15 to 0.24 centimeters should initiate and sustain a substantially uniform discharge without preionization is an unexpected result.

The foregoing and other objects, features and advantages of the present invention will become more apparent in the light of the following detailed description of a preferred embodiment thereof as illustrated in the accompanying drawing.

DESCRIPTION OF THE PREFERRED EMBODIMENT

Figure 1:
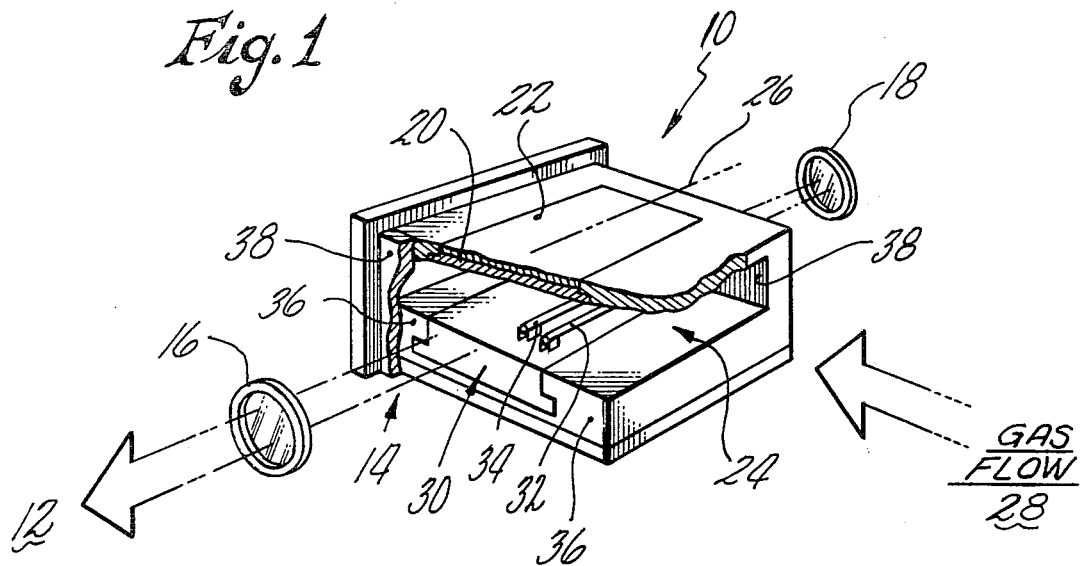
FIG. 1 shows a simplified perspective view of an electrode configuration in accordance with the present invention.

FIG. 1 shows a simplified perspective view of the present invention wherein an electrode configuration 10 is shown disposed about an optical axis 12 of a laser cavity 14 defined at one end by a first mirror 16 and at the other end by a second mirror 18. An anode 20 positioned within an anode holder 22 defines a first side of a gas path channel 24. The anode has a longitudinal axis 26 transversely disposed to a gas path 28. A cathode holder 30 defining a second side of the gas path channel 24 opposite the first side, contains a first thoriated rod 32 positioned on the upstream side of the cathode holder, and a second thoriated rod 34 positioned downstream of the first rod in a spaced apart, substantially parallel relationship thereto wherein the first and second thoriated rods operate as cathodes. The rods are disposed in a spaced apart and parallel relationship to the anode 20 and extend into the gas path channel 24. The anode holder 22 and the cathode holder 30 are attached to end plates 36 which cooperate with the side walls 38 to define the gas path channel 24. The first and second mirrors 16, 18, respectively are mounted along the optical axis 12 and are in line-of-sight optical communication with one another through openings (not shown) within the side walls 38.

Figure 2:
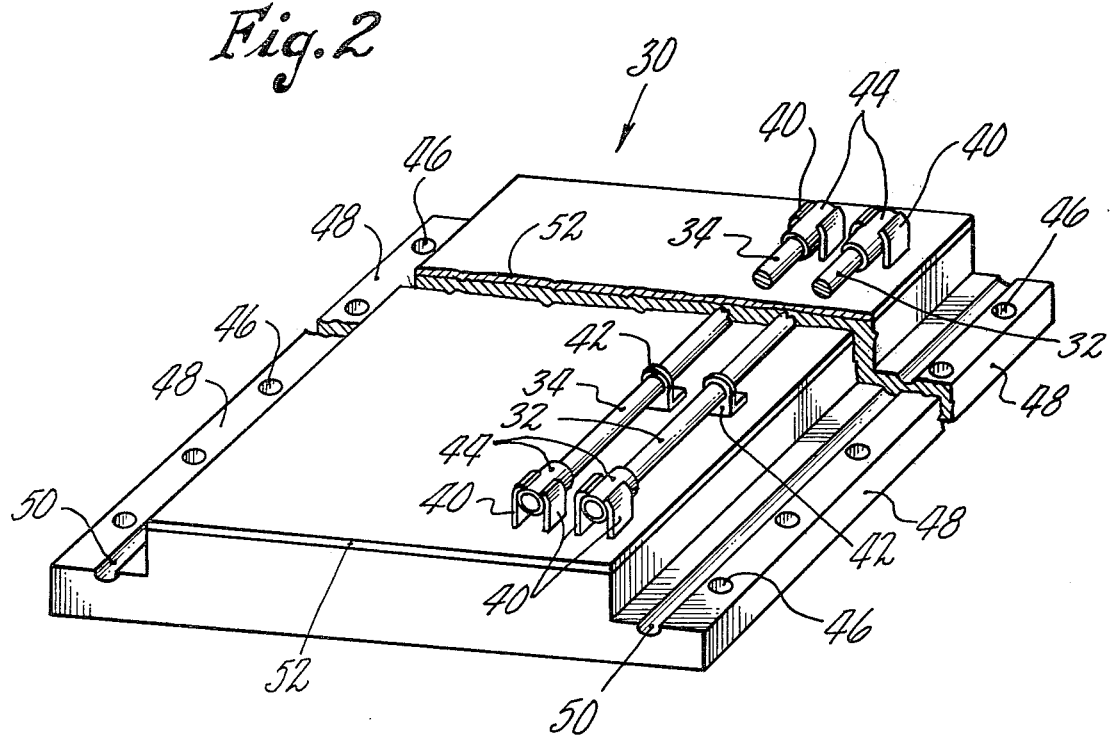
FIG. 2 is a simplified view of the cathode of the electrode configuration as shown in FIG. 1.

FIG. 2 shows a simplified view of the cathode holder 30 with the first and second thoriated rods 32, 34 respectively positioned thereon. Each rod is positioned within a rod holder 40 substantially disposed on opposite ends of the cathode holder with an electrical connector 42 centrally located along the length of the rod. Insulation caps 44 disposed on opposite ends of the rod are adapted for preventing the discharge from favoring the rod electrode ends where the electric field is high and where the gas flow velocity within the gas path channel 24 as shown in FIG. 1 is slower due to wall effects. Bolt holes 46 are positioned along the perimeter 48 of the cathode holder for securing the holder to the end plates 36 as shown in FIG. 1. An O-ring groove 50 located on the perimeter 48 is capable of accommodating a seal to provide a gas tight connection between the cathode holder and the end plate. The cathode holder is formed with electrical insulation material having a sufficient dielectric strength, such as aluminum oxide, to avoid electrical shorting between the cathode elements.

A layer of pyroceram material 52 is deposited on the electrical insulation material to provide thermal insulation between the cathodes 32, 34 and the electrical discharge. In the preferred embodiment the cathode rods 32, 34 are formed with thoriated material, as for example, a common tungsten welding rod.

In the operation of the device as shown in FIG. 1, a suitable lasing gas mixture such as carbon dioxide, nitrogen and helium flows through the gas path channel 24 between the cathode and the anode with a pressure typically in excess of 50 torr or preferably in the range of several hundred torr. The application of an appropriate electric potential between the cathode and the anode produces within the gas an electrical discharge having substantial uniformity. The rods provide an extended continuous cathode area resulting in a substantially uniform diffused discharge between the cathode and the anode.

Figure 3:
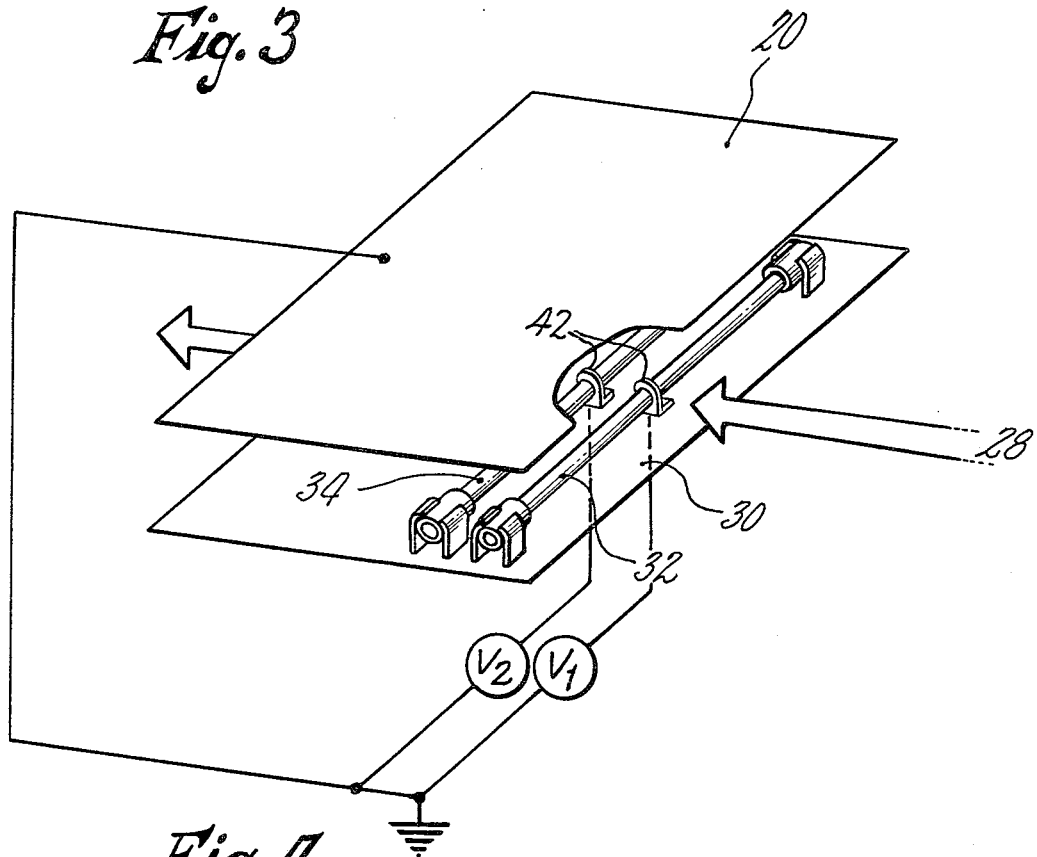
FIG. 3 is a simplified view of the electrical circuit for the electrode configuration of FIG. 1.
Figure 4:
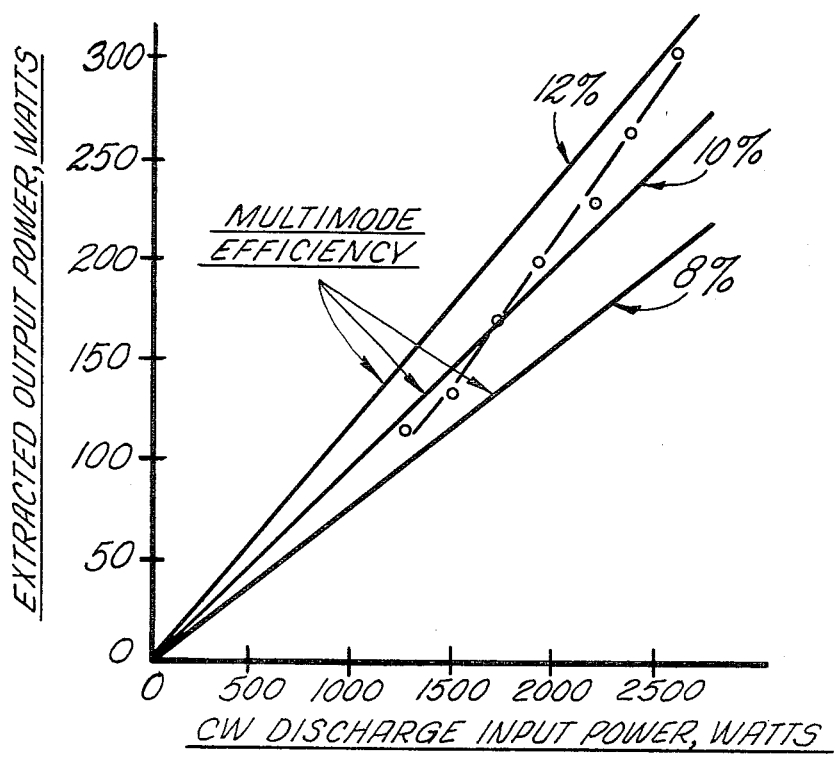
FIG. 4 shows a representative curve of the continuous wave power extraction of a laser operated in accordance with the present invention as a function of the electrical power input to the laser.

The utilization of at least two cathode rods transversely disposed to the path of the gas in a spaced apart relationship to one another allows the power deposition in the gas to be controlled by power sources $V_1$ and $V_2$ as shown in FIG. 3 to adjust the discharge conditions to optimize the optical power extraction from the laser. As shown in FIG. 3, the electrical circuits do not include ballast resistance. With the configuration shown in FIG. 1 for a recirculating system (not shown) the laser was operated at a total pressure of approximately one hundred fourteen torr with a gas mixture of ten torr carbon dioxide, forty-five torr nitrogen and fifty-nine torr helium and had a twenty centimeter gain length and a single pass optical system. The continuous wave discharge generated between a single thoriated rod cathode having a diameter of 0.15 centimeter and a planar anode operated with a voltage of approximately two kilovolts yielded an E/P of about nine volts per centimeter per torr close to the optimum value for carbon dioxide lasers. As the discharge current was varied from six hundred milliamps to twelve hundred milliamps, the length of the rod emission varied up to a maximum of twenty-five centimeters which occurred at a current of twelve hundred milliamps. The power extracted from the cavity by the first mirror having a flat reflective surface with a ninety-five percent reflectivity and the second mirror having a concave reflective surface with a radius of curvature of three meters and a substantially one hundred percent reflectivity, had a value of three hundred five watts with an electrical discharge power of twenty-five hundred watts as shown in FIG. 4 with an efficiency of eleven and eight tenths percent. The gain length was twenty-five centimeters. At this value the power output was insensitive to recirculating flow rate.

For proper operation of this preferred embodiment, the rods must be maintained in a parallel relationship to the anode to eliminate electrical field distortions which can give rise to discharge nonuniformities. Thus bending of the rods in the center region must be minimized or eliminated. In the preferred embodiment the electrical holders 42 are utilized to centrally maintain the rigidity of the rods. Additionally, the rods extend into the gas stream a sufficient distance to insure that the active electrical portion of the rod is outside of the gas flow boundary layer that normally develops along the walls of a flow channel. The rods have a cylindrical configuration preferably having a cross-sectional area sufficiently small to minimize perturbation to the flow.

Referring now to FIG. 3 which shows a simplified schematic of the electrical circuit adapted for providing power to the rods, each rod is connected to a separate source of electrical power $V_1$ and $V_2$, respectively capable of initiating and sustaining the discharge within the gas. The sources of electrical power $V_1$ and $V_2$ are capable of being adjusted to control the power deposition into the gas per unit length in the flow direction to shape the discharge characteristics for optimization of the gain volume to that of the resonator mode volume to obtain efficient optical power extraction.

Although the invention has been shown and described with respect to a preferred embodiment thereof, it should be understood by those skilled in the art that the foregoing and various other changes and omissions in the form and detail thereof may be made therein without departing from the spirit and scope of the invention.

Having thus described a typical embodiment of our invention that which we claim as new and desire to secure by Letters Patent of the United States is:

1. Apparatus for providing, in response to electric potential signals applied thereto from one or more sources of electrical signals, the deposition of electrical power into a lasing gas mixture flowing through the discharge region of the optical cavity of an electric discharge laser system, comprising:
    an anode having a substantially planar configuration, one major surface of which defines one side of the lasing gas flow path through the discharge region; and
    a cathode, including a planar mounting structure having a major surface which is parallel to and in spaced relation with said anode major surface for defining an opposite side of the lasing gas flow path through the discharge region, said cathode further including one or more cathode elements comprised of a thoriated material, each disposed on said mounting structure major surface in a transverse relation to the gas flow path and in parallel registration with said anode major surface, said cathode elements each connected for response to one polarity of the electrical potential signals applied thereto, an opposite polarity of which is presented to said anode, whereby said cathode elements in combination with said anode provide the deposition of electrical power into the lasing gas mixture flowing therebetween.

2. The apparatus of claim 1, wherein said cathode elements comprise thoriated tungsten.

3. The apparatus of claim 1, wherein said cathode elements are each provided in a common, rod-like geometry, said rod cathode elements being disposed on said mounting structure with the longitudinal axis of each in transverse relation to the gas flow in parallel registration with the major surfaces of said anode and said mounting structure.

4. The apparatus of claim 3, wherein each of said rod cathode elements have a diameter value in the range of from 0.15 to 0.24 centimeters.

5. The apparatus of claims 1 or 3, wherein each of said cathode elements receive the electrical potential signals from a separate, associated one of a plurality of signal sources, the opposite polarity outputs of which are connected in common to said anode.

6. The apparatus of claim 5, wherein each of said cathode elements are adapted to receive the electric potential signal from the associated signal source at a central location of the portion thereof disposed within the gas flow path.

7. An electric discharge laser system, having:
    an optical cavity, including a discharge region disposed therein, said discharge region defining a gas flow path through said optical cavity wherein electrical power, provided as electric potential signals from one or more sources of electrical signals, is discharged into a lasing gas mixture flowing through said flow path by the improved electrode configuration, comprising:
    an anode disposed in said discharge region and having a substantially planar configuration, one major surface of which defines one side of said gas flow path; and
    a cathode disposed in said discharge region and including a planar mounting structure with a major surface parallel to and in spaced relation with said anode major surface for defining an opposite side of said gas flow path, said cathode further including one or more cathode elements comprised of a thoriated material, each disposed on said mounting structure major surface in transverse relation to said gas flow path and in parallel registration with said anode major surface, said cathode elements each connected to one polarity of said electric potential signals the opposite polarity of which is presented to said anode, whereby said cathode elements in combination with said anode provide in response to said electric potential signals said electrical power discharge into said lasing gas mixture flowing therebetween.

8. The laser system of claim 7, wherein said cathode elements comprise thoriated tungsten.

9. The laser system of claim 7, wherein said cathode elements are each provided in a common, rod-like geometry, said rod cathode elements being disposed on said mounting structure with the longitudinal axis of each in transverse relation to said gas flow path and in parallel registration with said anode major surface.

10. The laser system of claim 9, wherein said rod cathode elements have a diameter value in the range of from 0.15 to 0.24 centimeters.

11. The laser system of claims 7 or 9, wherein each of said cathode elements receive said electric potential signals from a separate, associated one of a plurality of signal sources, the opposite polarity outputs of which are connected in common to said anode.

12. The laser system of claim 11, wherein each of said cathode elements are responsive to the electric potential signals from the associated signal source at a central location of the portion thereof disposed within said gas flow path.

13. A method for generating an electric discharge laser signal, comprising the steps of:
   providing an electrode assembly including an anode element in spaced relation with and parallel to one or more rod-like cathode elements comprised of a thoriated material, and defining a discharge region in the space therebetween;
   flowing a lasing gas mixture under pressure through said discharge region in a direction transverse to the longitudinal axis of said cathode elements;
   applying an electric potential between said cathode elements and said anode element, thereby creating an electric discharge in said lasing gas mixture;
   amplifying the resultant optical radiation in said electric discharge with an optical cavity having an optical axis transverse to the flow of said lasing gas mixture to provide a discharge laser signal.

14. The method of claim 13 wherein the cathode elements comprise thoriated tungsten.

15. The method of claim 13 wherein the step of flowing includes maintaining the gas flow at a pressure of at least one hundred torr through said discharge region.

16. The method of claim 15 wherein said lasing gas mixture comprises carbon dioxide, nitrogen, and helium.

* * * * *